US012407995B2

(12) United States Patent
Hatab

(10) Patent No.: US 12,407,995 B2
(45) Date of Patent: Sep. 2, 2025

(54) SYSTEM, APPARATUS, AND METHOD FOR MULTI-DIMENSIONAL ADAPTIVE MICROPHONE-LOUDSPEAKER ARRAY SETS FOR ROOM CORRECTION AND EQUALIZATION

(71) Applicant: HARMAN INTERNATIONAL INDUSTRIES, INCORPORATED, Stamford, CT (US)

(72) Inventor: Ziad Ramez Hatab, Bloomfield Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 215 days.

(21) Appl. No.: 17/925,944

(22) PCT Filed: May 20, 2020

(86) PCT No.: PCT/US2020/033802

§ 371 (c)(1),
(2) Date: Nov. 17, 2022

(87) PCT Pub. No.: WO2021/236076

PCT Pub. Date: Nov. 25, 2021

(65) Prior Publication Data

US 2023/0199419 A1 Jun. 22, 2023

(51) Int. Cl.
*H04S 7/00* (2006.01)
*H04R 5/02* (2006.01)
(Continued)

(52) U.S. Cl.
CPC ............... *H04S 7/301* (2013.01); *H04R 5/02* (2013.01); *H04R 5/027* (2013.01); *H04R 5/04* (2013.01);
(Continued)

(58) Field of Classification Search
None
See application file for complete search history.

(56) References Cited

U.S. PATENT DOCUMENTS

2008/0285775 A1 11/2008 Christoph et al.
2016/0196818 A1 7/2016 Christoph
2020/0382863 A1* 12/2020 Matheja .................. G10L 25/78

FOREIGN PATENT DOCUMENTS

CN 1659927 A 8/2005
CN 102055425 A 5/2011
(Continued)

OTHER PUBLICATIONS

International Preliminary Report on Patentability dated Dec. 1, 2022 for PCT Appn. No. PCT/US2020/033802 filed May 20, 2020, 12 pgs.

(Continued)

*Primary Examiner* — Kenny H Truong
(74) *Attorney, Agent, or Firm* — Brooks Kushman, P.C.

(57) ABSTRACT

In at least one embodiment, an audio system is provided. The audio system includes a plurality of loudspeaker, a plurality of microphones, and an audio controller. The plurality of loudspeakers transmits an audio signal in a listening environment. The plurality of microphones detects the audio signal in the listening environment. The at least one audio controller is configured to determine a first psychoacoustic perceived loudness (PPL) of the audio signal as the audio signal is played back through a first loudspeaker of the plurality of loudspeakers and to determine a second PPL of the audio signal as the audio signal is sensed by a first microphone of the plurality of microphones. The at least one audio controller is further configured to map the first loudspeaker of the plurality of loudspeakers to the first microphone of the plurality of microphones based at least on the first PPL and the second PPL.

13 Claims, 6 Drawing Sheets

(51) Int. Cl.

| | |
|---|---|
| ***H04R 5/027*** | (2006.01) |
| ***H04R 5/04*** | (2006.01) |
| ***H04S 5/00*** | (2006.01) |

(52) U.S. Cl.
CPC .............. *H04S 7/305* (2013.01); *H04S 7/307* (2013.01); *H04R 2201/401* (2013.01); *H04S 5/00* (2013.01); *H04S 2400/13* (2013.01); *H04S 2400/15* (2013.01)

(56) References Cited

FOREIGN PATENT DOCUMENTS

| | | | |
|---|---|---|---|
| CN | 103634726 | A | 3/2014 |
| CN | 108141687 | A | 6/2018 |
| CN | 109413545 | A | 3/2019 |
| EP | 1986466 | A1 | 10/2008 |
| EP | 3040984 | A1 | 7/2016 |
| WO | 2018001352 | A1 | 1/2018 |
| WO | 2019197002 | A1 | 10/2019 |

OTHER PUBLICATIONS

International Search Report and Written Opinion dated Feb. 1, 2021 for PCT Appn. No. PCT/US2020/033802 filed May 20, 2020, 19 pgs.
First Chinese Office Action dated May 23, 2024 for Chinese Application No. 202080101091.1 filed Nov. 18, 2022, 17 pgs.
Second Chinese Office Action dated Nov. 29, 2024 for Chinese Application No. 202080101091.1 filed Nov. 18, 2022, 4 pgs.

* cited by examiner

SYSTEM, APPARATUS, AND METHOD FOR MULTI-DIMENSIONAL ADAPTIVE MICROPHONE-LOUDSPEAKER ARRAY SETS FOR ROOM CORRECTION AND EQUALIZATION

CROSS-REFERENCE TO RELATED APPLICATION

This application is the U.S. national phase of PCT Application No. PCT/US2020/033802 filed on May 20, 2020, the disclosure of which is incorporated in its entirety by reference herein.

TECHNICAL FIELD

Aspects disclosed herein may generally relate to a system, apparatus, and method for multi-dimensional adaptive microphone-loudspeaker array sets for room correction and room equalization. In one aspect, the disclosed system, apparatus and/or method may map listening rooms into microphone and loudspeaker array sets according to criteria based on human perception of sound and psychoacoustics. These aspects and others will be discussed in more detail below.

BACKGROUND

When sound is reproduced by one or more loudspeakers, the perception of the desired auditory illusion is modified by the listening environment. The sound reproduction system can also introduce undesired artifacts. Room response equalization (RRE) aims at improving the sound reproduction in rooms by applying advanced digital signal processing techniques to design an equalizer on the basis of one or more measurements of the room response. Various established techniques can be used for solving the RRE problem including, homomorphic filtering, linear predictive coding (LPC), least-squares optimization, frequency-domain deconvolution, and multiple-input/multiple-output inverse theorem (MINT) solutions. Various pre-processing methods are usually employed for improving RRE techniques such as non-uniform frequency resolution, complex smoothing, frequency warping, Kautz filters and multi-rate filters. Current room correction and equalization techniques may be categorized as single position or multiple position monitoring with fixed or adaptive room equalizers. Their complexities may increase exponentially as more features are supported. Thus, such systems may become an obstacle for successful implementation on real-time processors. Additionally, these solutions may not utilize psychoacoustics which involves the study of sound perception and audiology based on the manner in which humans perceive various sounds.

Current loudspeaker-microphone array sets mapping techniques rely on proximity analysis for determining the influential loudspeakers on a given listening position. In other words, the loudspeakers are mapped to listening areas based on their physical distance from the microphones within the listening area. These techniques become inefficient in small enclosures, like car cabins, where a large number of loudspeakers may become equally close to more than one listening position, thus increasing the computational complexities and reducing the benefits of room equalization. Moreover, proximity analysis may exclude influential speakers, which are beyond a given distance from the listening position.

SUMMARY

In at least one embodiment, an audio system is provided. The audio system includes a plurality of loudspeaker, a plurality of microphones, and an audio controller. The plurality of loudspeakers transmit an audio signal in a listening environment. The plurality of microphones detect the audio signal in the listening environment. The at least one audio controller is configured to determine a first psychoacoustic perceived loudness (PPL) of the audio signal as the audio signal is played back through a first loudspeaker of the plurality of loudspeakers and to determine a second PPL of the audio signal as the audio signal is sensed by a first microphone of the plurality of microphones. The at least one audio controller is further configured to map the first loudspeaker of the plurality of loudspeakers to the first microphone of the plurality of microphones based at least on the first PPL and the second PPL.

In at least one embodiment, an audio system is provided. The audio system includes a plurality of loudspeakers, a plurality of microphones, and at least one audio controller. The plurality of loudspeakers is configured to transmit an audio signal in listening environment. Each of the microphones is positioned at a respective listening location in the listening environment. The plurality of microphones is configured to detect the audio signal in the listening environment. The at least one audio controller is configured to determine a first psychoacoustic perceived loudness (PPL) for each loudspeaker of the plurality of loudspeakers and to determine a second PPL for each microphone of the plurality of microphones to employ an adaptive process for equalizing the audio signal in the listening environment.

In at least one embodiment, a method for employing an adaptive process for equalizing an audio signal in the listening environment is provided. The method includes transmitting, via a plurality of loudspeakers, an audio signal in listening environment and detecting, via a plurality of microphones positioned in a listening environment, the audio signal in the listening environment. The method includes determining a first psychoacoustic perceived loudness (PPL) for each loudspeaker of the plurality of loudspeakers and determining a second PPL for each microphone of the plurality of microphones to employ an adaptive process for equalizing the audio signal in the listening environment based on the first PPL and the second PPL

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
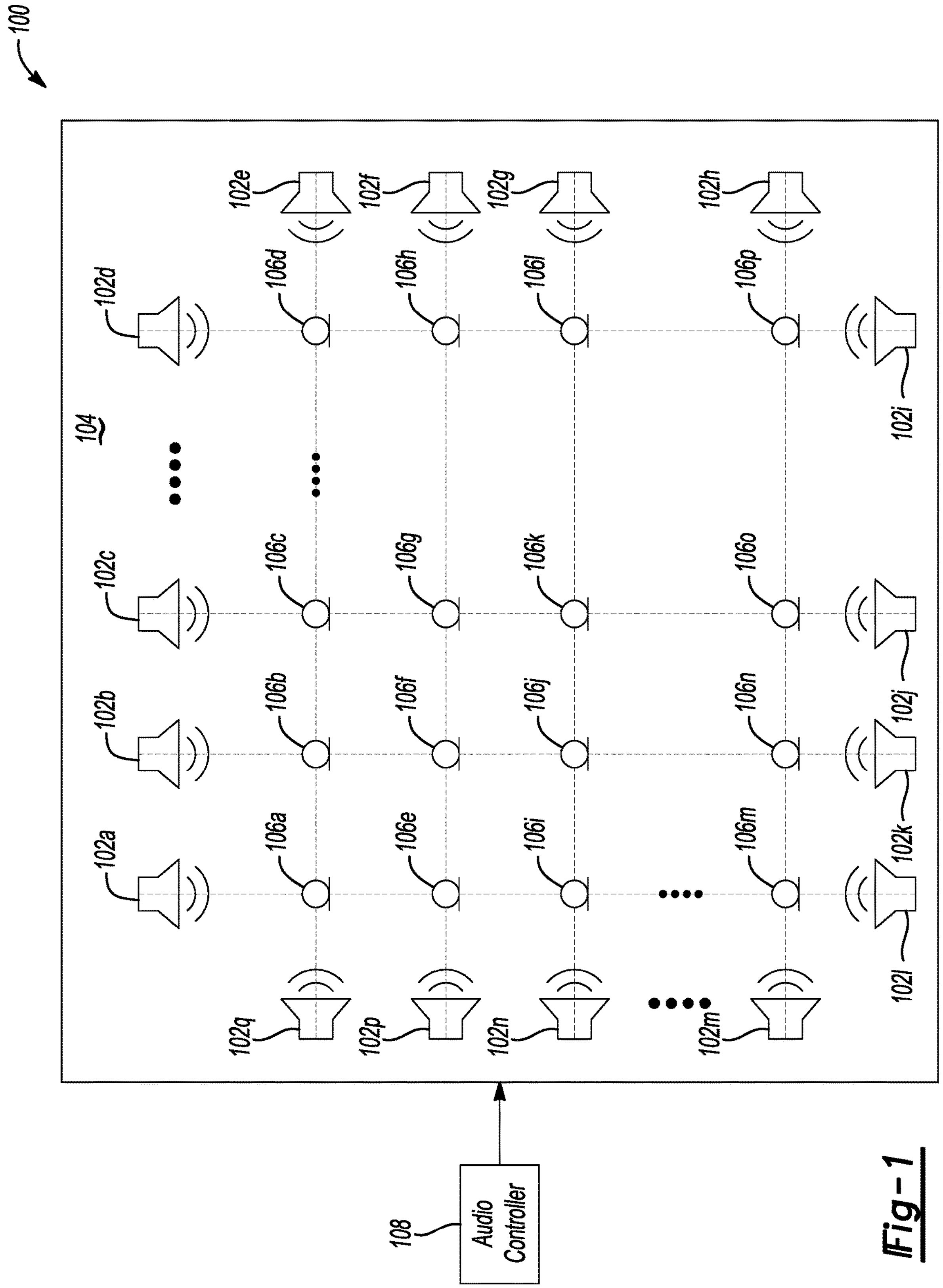
FIG. 1 illustrates a system for providing audio for a two-dimensional arbitrary, microphone and loudspeaker room array.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, microcontrollers, digital signal processors (DSPs), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Room equalization, or correction, may be necessary for a successful immersive and high-fidelity listening experience inside enclosed spaces such as, for example, vehicle cabins. The process of room equalization (RE) involves, among other things, compensating for unwanted room sound artifacts, such as early reflections, reverb reflections, surrounding material properties, and loudspeaker imperfections. Moreover, RE may be performed in a fixed manner or in an adaptive manner. In the fixed RE, calibration is performed initially, and filter coefficients are calculated and used with minimal to no updates after calibration. In adaptive RE, calibration is performed initially to determine some initial conditions and henceforth, run-time adaptation is performed to update filter coefficients to track changing room conditions in real time.

Most room enclosures are considered weakly stationary environments. For example, room conditions change as functions of room geometry (i.e., furniture, fixtures, luggage, etc.), room capacity (i.e., number of people, pets, etc.), and room environment (i.e., temperature, humidity, etc.). Therefore, it may be necessary to adapt RE filter coefficients to these changing conditions for improved performance.

Aspects disclosed herein map listening rooms into microphone and loudspeaker array sets based on the human perception of sound (e.g., psychoacoustics). Following this initial calibration phase, a run-time process continuously updates equalization filter coefficients to adapt for the changing conditions for a room. The disclosed techniques involve human perception properties and are flexible enough to allow these modes of operation depending on the application. In particular, the disclosed techniques may map any number of loudspeakers to any number of listening positions. Moreover, the equalization filter coefficients may be fixed where the calibration process is performed, and the filter coefficients may be adaptive when the run-time process is performed in addition to calibration.

FIG. 1 illustrates an example audio system 100. The system 100 includes an array of loudspeakers **102*a*-102*g* (e.g., "102") positioned in a listening environment 104. The listening environment 104 may correspond to, for example, a vehicle cabin, living room, concert hall, etc. While FIG. 1 depicts that the loudspeakers 102 surround an array of microphones, such microphones correspond to simulated listening positions of users 106*a*-106*p* (e.g., "106") in the listening environment 104. An audio controller 108 is operably coupled to the array of loudspeakers 102 for providing an audio input via the loudspeakers 102 into the listening environment 104. It is recognized that the locations of the loudspeakers 102 and the listening positions of users 106 may be fixed or variable. The loudspeakers 102 and the listening positions of users 106 generally form a two-dimensional array. It may be desirable to map a corresponding loudspeaker 102 to one or more listening positions 106** to enable a user to experience optimal sound perception of the audio.

Figure 2:
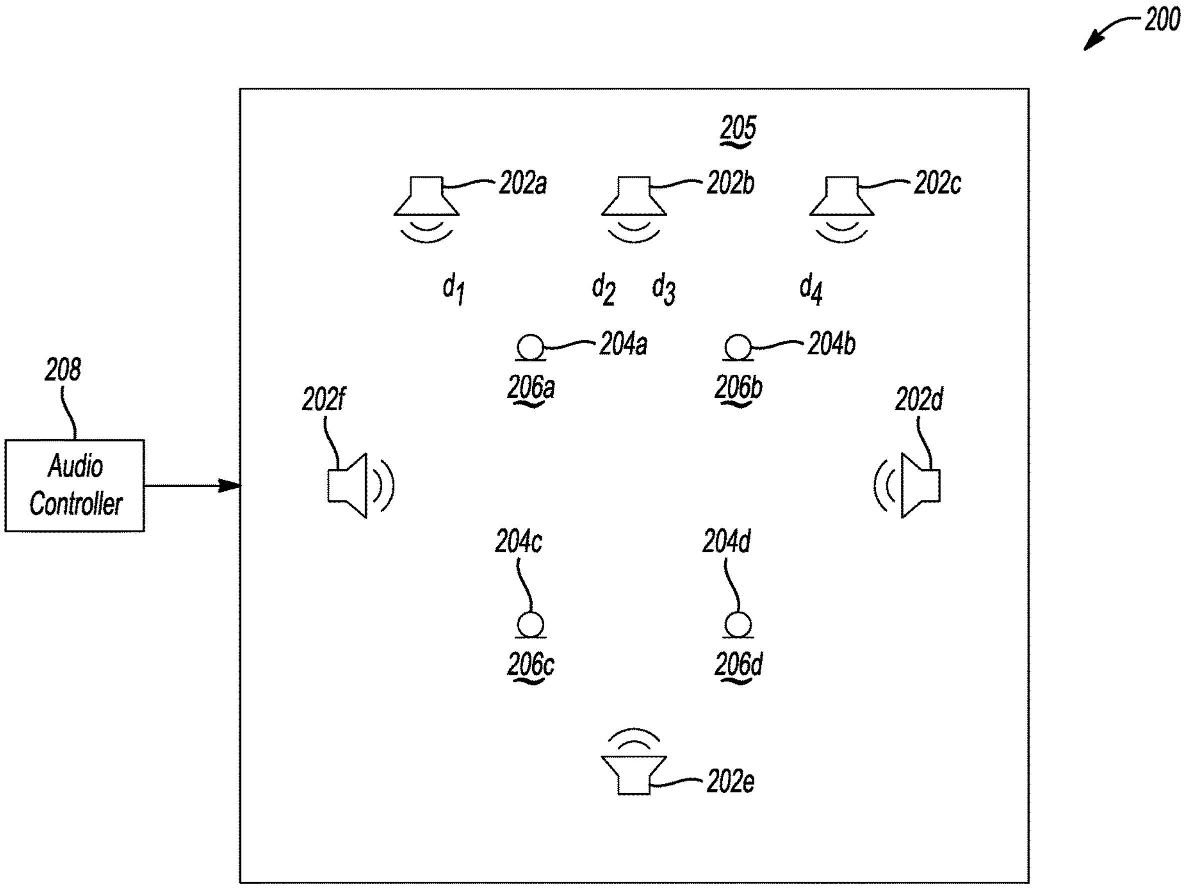
FIG. 2 illustrates a system for providing audio for a two-dimensional microphone and loudspeaker room array in accordance to one embodiment.

FIG. 2 illustrates an audio system 200 in accordance to one embodiment. The audio system 200 includes an array of loudspeakers **202*a*-202*f* ("202") and an array of microphones 204*a*-204*c* ("204") positioned in a listening environment 205. Each of the microphones 204*a*-204*d* are positioned at corresponding listening positions of users 206*a*-206*d*, respectively, in the listening environment. At least one audio controller 208 (hereafter "audio controller") is operably coupled to the array of loudspeakers 202 for providing an audio input via the loudspeakers 202 into the listening environment 205. The audio input includes signals with acoustic frequencies in the audible and/or ultrasonic ranges. For example, the audio input may include test signals such as sine waves, chirp waves, gaussian noise, pink noise, etc. or audio recordings. It is recognized that the locations of the loudspeakers 202 and the listening positions of users 206 may be fixed or variable. It is desirable to map a corresponding loudspeaker 202 to one or more of the listening positions 206. The microphones 204 are illustrated and provided in the listening environment 205 to enable the audio controller 208 to perform calibration for mapping each loudspeaker 202 to one or more microphones 204 (i.e., or one or more listening positions 206**).

As noted above, it is desirable to map a corresponding loudspeaker 202 to one or more of the listening positions 206 to enable the user to experience the most optimal listening experience. The mapping of a particular loudspeaker 202 to one or more of the listening positions 206 to achieve optimal audio playback (i.e., audio perception) may be based on, for example, the psychoacoustic perceived loudness (PPL) and on the distance of the loudspeaker 202 to the listening position 206. PPL is a measure of perceptually relevant information contained in any audio record.

PPL represents a theoretical limit on how much acoustic energy is perceived by the human ear at various time intervals or frames. PPL is defined as follows:

$$PPL=\Sigma_{k=1}^{CB}[E(k)-T(k)]$$

Where E(k) is the energy in the kth psychoacoustic critical band and is complex-valued, T(k) is the masking threshold in the kth psychoacoustic critical band and is real-valued, and CB is the number of psychoacoustic critical bands. The masking threshold for critical band, k provides a power level under which any acoustic energy is not audible to the listener. Acoustic energy in critical band, k above the masking threshold is audible to the listener. Calculations of E(k) and T(k) follow techniques developed in the areas of perceptual coding of digital audio. For example, the audio signal is first windowed and transformed to the frequency domain. A mapping from frequency domain to psychoacoustic critical band domain is performed. Masking thresholds are then obtained using perceptual rules. The frequency-domain transformation is performed by first multiplying a section of the audio input, or frame, defined over a time interval, with a window function, for example Hamming, Hann, Blackman etc., followed by a time to frequency transform, such as, FFT, DFT, DCT, Wavelet, etc. The frequency-domain signal is then multiplied by a matrix of linear or non-linear mappings from frequency-domain to psychoacoustic critical band domain. The psychoacoustic critical band domain includes perceptual scales such as the equivalent rectangular bandwidth (ERB) scale, the Bark scale, or Mel scale. The masking thresholds T(k) may be estimated by first calculating the power in each critical band, i.e., $P(k)=Real(E(k))^2+Imaginary((E(k))^2$, applying a spreading function (SF), and then calculating various psychoacoustic measures such as spectral flatness measure (SFM), coefficient of tonality, and masking offsets.

PPL ideal (PPL_I) (or the first psychoacoustic perceived loudness) is generally calculated from the audio inputs (and at the loudspeakers 202*a*-202*c*) at some time intervals or over the whole audio sequence. PPL measured (PPL_M) (or the second psychoacoustic perceived loudness) is calculated at the microphone inputs at similar time intervals. PPL loss (PPL_L) is the difference between PPL_I and PPL_M and measures the amount of acoustic energy deviations from ideal due to room conditions and speaker imperfections. PPL_L is calculated as complex-valued and hence contains information on both level deviations (magnitude) and time of arrival deviations (phase), $$PPL_L=PPL_I-PPL_M=\Sigma_{k=1}^{CB}[E_I(k)-T_I(k)]-\Sigma\Sigma_{k=1}^{CB}[E_M(k)-T_M(k)]$$

It's reasonable to assume that measured masking thresholds, TM(k), should be equal to ideal masking thresholds, TI(k), so PPL_L in equation above is approximated as:

$$PPL_L=PPL_I-PPL_M=\Sigma_{k=1}^{CB}[E_I(k)-E_M(k)]$$

This approximation may avoid the computationally intensive masking threshold computations while still providing accurate results for magnitude and phase of the acoustic deviations from ideal.

Thus, in order to take into account, the PPL of the loudspeaker 202 to the listening position 206 (e.g., the microphone 204), the audio controller 208 performs the following calibration process. For each microphone 204 or "m", the audio controller 208 measures a PPL_I from each loudspeaker 202, while a calibration audio signal is played back in the listening environment. This results in (m*s) PPL_M quantities at the microphones, which measure the influences of room conditions and loudspeaker design on every microphone 204 according to equations:

$$|PPL_I|=\Sigma_{k=1}^{CB}|E_I(k)-T_I(k)|;\ \text{for } |E_I(k)|>T_I(k)$$

$$|PPL_M|=\Sigma_{k=1}^{CB}|E_M(k)-T_M(k)|;\ \text{for } |E_M(k)|>T_M(k)$$

$$|PPL_L|=|PPL_I|-|PPL_M|$$

Where | | is the complex magnitude operator and only energies above their respective critical band hearing thresholds are included.

For each microphone 204 positioned in the array as illustrated in FIG. 2, the audio controller 208 determines the loudest set of loudspeakers within the array of loudspeakers 202 using PPL. For example, |PPL_I| of the input audio waveform is calculated by the audio controller 208 over either the entire track length of the audio or at some time intervals (e.g., example every 10 milliseconds) as the audio is played sequentially through loudspeakers 202*a*, 202*b*, 202*c*, 202*d*, 202*e*, and 202*f*. Simultaneously, as audio is playing through each loudspeaker 202, |PPL_M| is measured at microphone 204*a* over similar time intervals. For each loudspeaker 202, |PPL_L| is calculated as the difference between |PPL_I| and |PPL_M|, which determines perceived audible deviations at the listening position 206*a*. The magnitude quantity of PPL_L determines perceived audio loudness levels deviations from ideal at the listening position 206*a*. A programmable threshold level of perceived loudness magnitude loss is used to discriminate between influential loudspeakers 202 at listening position 204*a* from non-influential loudspeakers. The audio controller 208 may assign any given microphone 204 to one or more loudspeakers 202. For example, the audio controller 208 may assign loudspeakers 202*a* and 202*b* to microphone 204*a* based on the psychoacoustic perceived loudness. The audio controller 208 may assign loudspeakers 202*b* and 202*c* to the microphone 204*b* based on loudness (e.g., based on PPL and PPL loss).

Figure 3:
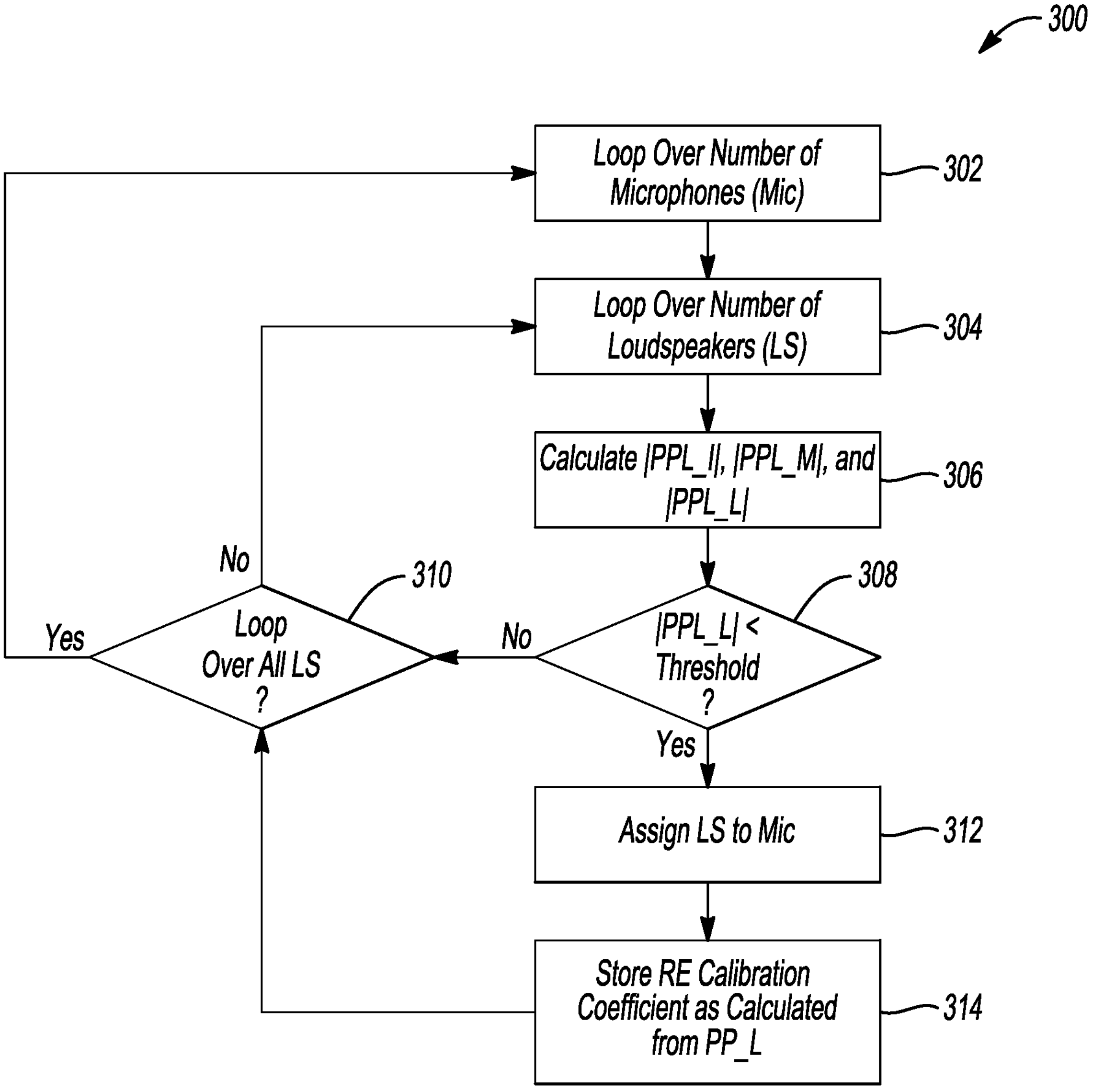
FIG. 3 illustrates a method for performing a calibration to map one or more loudspeakers to one or more microphones in accordance to one embodiment.

FIG. 3 illustrates a method 300 for performing a calibration to map one or more loudspeakers 202 (e.g. an array of loudspeakers 202) to one or more microphones 204 (e.g., an array of microphones 204) in accordance to one embodiment. In operation 302, the audio controller 208 loops over the number of microphones 204 positioned within the listening environment 205. In this operation, the audio controller 208 stores data corresponding to the total number of microphones 204 that are positioned in the listening environment 205.

In operation 304, the audio controller 208 loops over the number of loudspeakers 202 positioned within the listening environment 205. In this operation, the audio controller 208 stores data corresponding to the total number of loudspeakers 202 that are positioned in the listening environment 205.

In operation 306, the audio controller 208 calculates the |PPL_I|, |PPL_M|, and |PPL_L| loss for each microphone and loudspeaker group set iteration.

In operation 308, the audio controller 208 compares |PPL_L| to a programmable threshold level of perceived loudness magnitude loss which is used to discriminate between influential loudspeakers 202 at listening position 204*a* from non-influential loudspeakers. As noted above, |PPL_L| is calculated as the difference between |PPL_I| and |PPL_M|, which determines perceived audible deviations at the listening position 206*a*. If the |PPL_L| is less than the programmable threshold level, then the method 300 moves to operation 310. If not, then the method 300 moves to operation 312.

In operation 310, the audio controller 208 determines whether all of the loudspeakers 202 in the army have generated the |PPL_I|, |PPL_M|, and |PPL_L| loss (e.g., operations 306 and 308 are executed for every loudspeaker 202 in the array). If this condition is met, then the method 300 moves to operation 302. If not, then the method moves back to operation 304.

In operation 312, the audio controller 208 assigns a corresponding loudspeaker 202 to one or more microphones 204. In operation 314, the audio controller 208 stores RE calibration fixed coefficients that are ascertained via from the PPL_L (i.e., the psychoacoustic perceived loudness loss). Once the loudspeaker-microphone array set mapping is complete and the fixed calibration coefficients calculated and stored, then RE is performed by applying these coefficients to the input of the loudspeakers as illustrated in FIG. 4.

Figure 4:
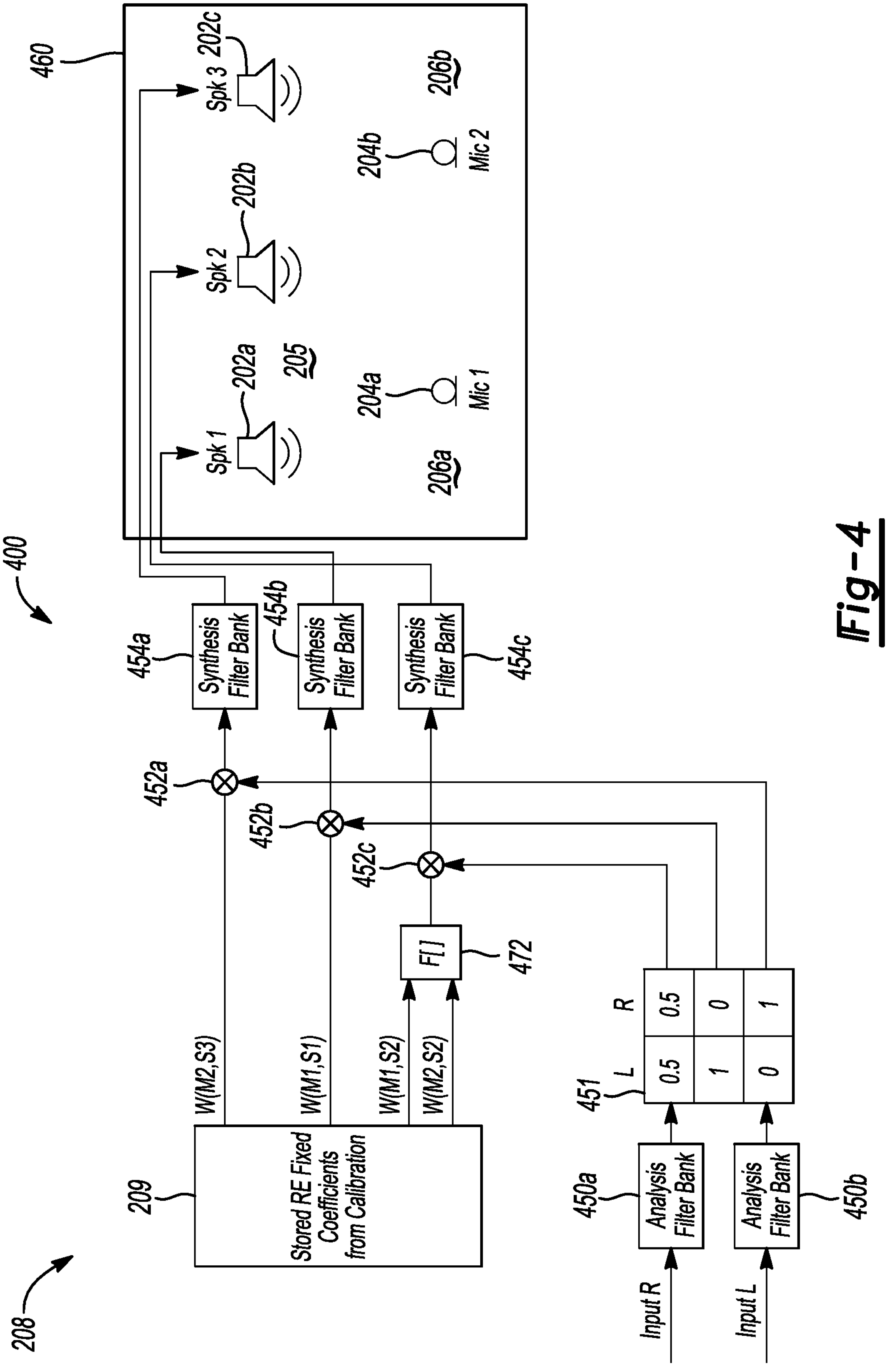
FIG. 4 illustrates a system for assigning loudspeakers to microphones during the calibration method of FIG. 3 in accordance to one embodiment.

FIG. 4 illustrates a system 400 for assigning loudspeakers 202 to microphones 204 in reference to operation 312 of the method 300 of FIG. 3 in accordance to one embodiment. The system 400 includes the audio controller 208 and an array 460 having the one or more loudspeakers 202 and the one or more microphones 204. The one or more microphones 204 may be positioned proximate to corresponding listening positions of the users 206*a*-206*b*. The audio controller 208 includes memory 209 for storing the RE fixed coefficients as derived from the method 300 during calibration. The one or more microphones 204 may be positioned proximate to corresponding listening positions of the users 206. The audio controller 208 includes a first plurality of filter banks 450*a*-450*b*, a matrix mixer 451, a plurality of multiplier circuits 452*a*-452*c*, a second plurality of filter banks 454*a*-454*b*, and a function block 472.

With respect to the assignment of the loudspeakers 202 to the microphones 204, the audio controller 208 may assign the loudspeakers 202*a*, 202*b* to the microphone 204*a* at the listening position 206. The audio controller 208 may assign the loudspeakers 202*b*, 202*c* to the microphone 204*b* at the listening position 206*b*. The first plurality of filter banks 450*a*-450*b* may be implemented as analysis filter banks and is configured to transform a stereo audio input (e.g., inputs R and L) into the psychoacoustic critical band domain. The matrix mixer 451 generates three channels from the stereo 2-channel audio input. The calibration methodology of FIG. 3 generates 4 sets of fixed calibration coefficients (W(M1, S1), W(M1,S2), W(M2,S2), and W(M2,S3)) to perform RE in the listening environment 205. The function block 472 receives the calibration coefficients W(M1,S2) and W(M2, S3) and combines (or merges) the same to generate a single output which is fed to the multiplier circuit 472. The function block 472 merges the calibration coefficients W(M1,S2) and W(M2,S3) to combine responses from the microphones 204*a*, 204*b*, such as, but not limited to, maximum, minimum, average, smoothing. The second plurality of filter banks (or synthesis filter banks) 454*a*-454*c* are configured to filter outputs (e.g., compensated signals) from the multiplier circuits 452*a*-452*c*, respectively. The compensated signals are transformed back into the time-domain with the synthesis filter bank 454*a*-454*c* before being sent to the speakers 202*a*-202*c*.

Referring back to FIG. 3, in operation 314, the audio controller 208 stores the assignments of the one or more loudspeakers 202 to each microphone 204 in memory 209 thereof. As noted above in connection with FIG. 2, each of the microphones 204*a*-204*d* are positioned at corresponding listening positions (or locations) of users 206*a*-206*d*, respectively, in the listening environment 205.

Figure 5:
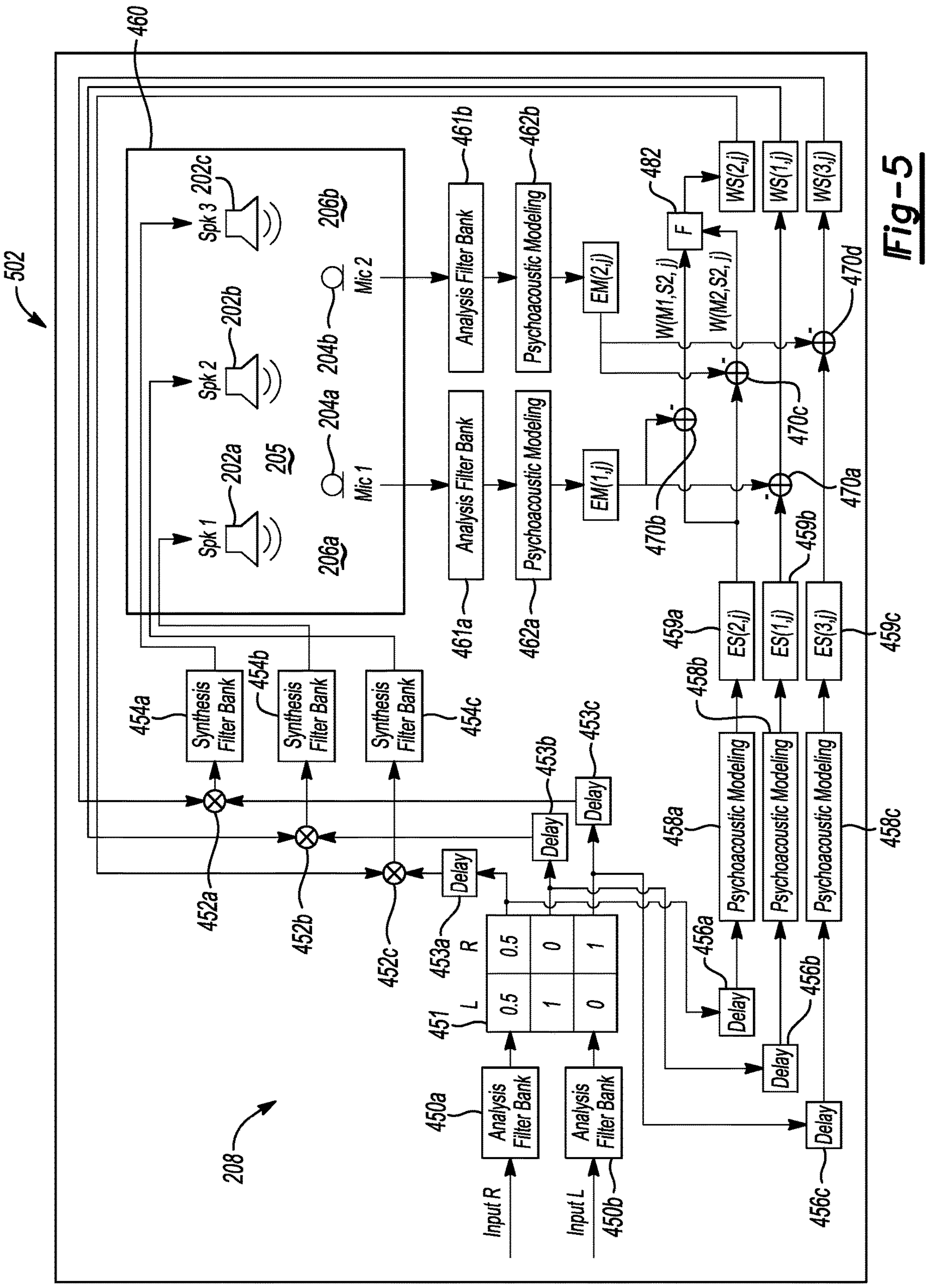
FIG. 5 illustrates a system for performing an adaptive run-time process for room correction and equalization in accordance to one embodiment.

FIG. 5 illustrates a system 500 for performing an adaptive run-time process for room correction and equalization to occur in real time in accordance to one embodiment. In contrast, the calibration process as disclosed in connection with FIG. 3 is static in terms of mapping the one or more loudspeakers 202 to one or more microphones 204 (or listening positions 206) to enable a user to experience optimal sound perception of the audio. It is recognized that numerous room conditions change as functions of room geometry (i.e., furniture, fixtures, luggage, etc.), room capacity (i.e., number of people, pets, etc.), and room environment (i.e., temperature, humidity, etc.) dynamically impact the listening experience for users in the listening environment 205. The system 500 is generally configured to employ a continuous run time algorithm to account for these changing room conditions. This may be advantageous for, but not limited to, a listening environment within a vehicle.

The system 500 generally includes various features as set forth in the system 400 of FIG. 4 (e.g., the audio controller 208, the first plurality of filter banks 450*a*-450*b*, the matrix mixer 451, the plurality of multiplier circuits 452*a*-452*c*, a second plurality of filter banks 454*a*-454*b*, and the array 460. The system 500 further includes a plurality of first delay blocks 453*a*-453*c*, a plurality of first delay blocks 456*a*-456*c*, a first plurality of psychoacoustic modeling blocks 458*a*-458*c*, a first plurality of difference blocks 459*a*-459*c*, a third plurality of filter banks 461*a*-461*b*, a second plurality of psychoacoustic modeling blocks 462*a*-462*b*, a plurality of comparators 470*a*-470*d*, and a function block 482.

The adaptive process performed by the system 500 may start with each of the microphones 204*a*-204*b* providing an audio input signal to the plurality of filter banks 450*a*-450*b*, respectively. In this case, the microphones 204*a*-204*b* generate outputs indicative of the audio being played in the listening environment 205 via playback from the loudspeakers 202*a*-202*c*. For example, and as noted in FIG. 4, the loudspeakers 202*a* and 202*b* may be assigned to the microphone 204*a* (or to listening position 206*a*) and the loudspeakers 202*b* and 202*c* may be assigned to the microphone 204*b* (or to listening position 206*b*). As noted above, the plurality of filter banks (or analysis filter bank) 450*a*-450*b* transforms the stereo audio input into audio in a psychoacoustic critical band domain. The matrix mixer 451 generates three channels from the stereo 2-channel audio input. The plurality of first delay blocks 453*a*-453*c* delay the outputs from the matrix mixer 451.

The compensation circuits 452*a*-452*c* are generally configured to compensate either the magnitude or phase (or both the magnitude and phase) of the audio input received. The second plurality of filter banks 454*a*-454*c* are configured to filter outputs from the compensation circuits 452*a*-452*c*, respectively. The plurality of filter banks 454*a*-454*c* are configured to transfer the compensated signals from the compensation circuits 452*a*-452*c* into the time-domain prior to the audio being transmitted to the loudspeakers 202*a*-202*c*. The loudspeakers 202*a*-202*c* playback the audio as provided by the second filter blocks 254*a*-254*c* into the listening environment 205. The microphones 204*a*-204*b* sense the audio as played back in the listening environment 205 and outputs the sensed audio to the third plurality of filter banks (or analysis filter banks) 461*a*-461*b*, respectively for filtering. The psychoacoustic modeling blocks 462*a*-462*b* convert the filtered, sensed audio and calculate an energy in each critical sub-band of a psychoacoustic frequency band which is represented by EM(m,j), where m corresponds to the number of microphones and j corresponds to the critical band in the psychoacoustic frequency scale from critical band number 1 to critical band number CB covering an audible acoustic frequency range, for example from 0 to 20 kHz. For example, the psychoacoustic modeling blocks 462*a*-462*b* generates EM(1, j) and EM(2, j), respectively. The psychoacoustic modeling block 462*a* provides EM(1, j) to the comparators 470*a*, 470*b*. The psychoacoustic modeling block 462*b* provides EM(2, j) to the comparators 470*c* and 470*d*. The relevance of the comparators 470*a*-470*d* will be discussed in more detail below.

While the audio input is provided to the first plurality of filter banks 450*a*-450*b*, the audio input is also provided to the delay blocks 456*a*-456*b*. The delay blocks 456*a*-456*b* delay the audio input by, for example, 10 to 20 msec. The delayed audio input is provided to the psychoacoustic modeling blocks 458*a*-458*c*. The delay blocks 456*a*-456*c* are applied to both microphone and loudspeaker paths to provide frame synchronization between both the microphone and loudspeaker paths. It is recognized that tuning of delay values that are utilized in the delay blocks 456*a*-456*c* may be necessary to achieve frame synchronization between both the microphone and loudspeaker paths (e.g., there will be a delay between when the loudspeaker 202 plays back the audio and then the microphone 204 captures the audio that is played back via the loudspeaker 202). The psychoacoustic modeling blocks 458*a*-458*c* convert the delayed audio inputs and calculate an energy in each critical sub-band of a psychoacoustic frequency band which is represented by ES(s,j), where s corresponds to the number of loudspeakers and j corresponds to the critical band number in the psychoacoustic frequency scale from critical band number 1 to critical band number CB covering the audible acoustic frequency range, for example from 0 to 20 kHz.

For the loudspeaker 202*a*, the comparator 470*a* generates sub-band coefficient WS(s,j) or WS(1,j) which generally corresponds to a difference between the psychoacoustic frequency band for the loudspeaker 202*a* and the microphone 204*a*. For example, the sub-band coefficient WS(1,j) =ES(1,j)−EM(1,j) which is transmitted to the compensation circuit 452*b* to modify the audio input to the loudspeaker 202*a*. Similarly for loudspeaker 202*b*, the comparator 470*b* generates sub-band coefficient $WS_1$(s,j) or $WS_1$(2,j) which generally corresponds to a first difference between the psychoacoustic frequency band for the loudspeaker 202*b* and the microphone 204*a*. For example, the sub-band coefficient $WS_1$(2,j)=ES(2,j)−EM(1,j) which is transmitted to the function block 482. Additionally, for the loudspeaker 202*b*, the comparator 470*c* generates sub-band coefficient $WS_2$(s,j) or $WS_2$(2,j) which generally corresponds to a second difference between the psychoacoustic frequency band for the loudspeaker 202*b* and the microphone 204*b*. The sub-band coefficient $WS_2$(2,j)=ES(2,j)−EM(2,j) is transmitted to the function block 482. The function block 482 combines responses for both microphones 204*a*, 204*b* by either taking a maximum, minimum, average, or smoothing, etc. of the responses for both microphones 204*a*, 204*b*. The function block 482 transmits an output which corresponds to the function of the psychoacoustic frequency band for the loudspeaker 202*b* and for both microphones 204*a*, 204*b* to the compensation circuit 452*c* to modify the audio input to the loudspeaker 202*b*.

For loudspeaker 202*c*, the comparator 470*d* generates sub-band coefficient WS(s,j) or WS(3,j) which generally corresponds to a difference between the psychoacoustic frequency band for the loudspeaker 202*c* and the microphone 204*b*. For example, the sub-band coefficient W'S(3,j) ES(3,j)−EM(2,j) which is transmitted to the compensation circuit 452*a* to modify the audio input to the loudspeaker 202*c*. The compensation circuits 452*a*, 452*b*, 452*c* applies a complex factor (e.g., via phase or magnitude).

The above adaptive process provides room equalization, or correction, which may provide for a successful immersive and high-fidelity listening experience inside enclosed spaces such as, for example, vehicle cabins. The process of room equalization (RE) involves, among other things, compensating for unwanted room sound artifacts, such as early reflections, reverb reflections, surrounding material properties, and loudspeaker imperfections.

Psychoacoustic perceived loudness (or PPL), which is the subjective perception of sound pressure, can be calculated using different techniques such as equal loudness contours, absolute threshold of hearing (ATH), A-weighting, K-weighting relative to full scale (LKFS), etc. PPL may also be calculated using the psychoacoustic definitions presented herein. The advantage of embodiments disclosed herein is the ability to obtain both magnitude and phase information for the room impairments through the complex nature of the critical sub-band analysis. For example, the loudspeaker 202*a* has the following transmitted and received loudness at the listening position 206*a* of the microphone 204*a*, respectively:

$$PPL_{TX}=\Sigma_j \Delta S(1,j)=\Sigma_j |ES(1,j)-TS(1,j)| \quad \text{(Eq. 1)}$$

$$PPL_{RX}=\Sigma_j \Delta M(1,j)=\Sigma_j |EM(1,j)-TS(1,j)| \quad \text{(Eq. 2)}$$

Eq. 1 may be executed by the difference blocks 459*a*-459*c* as noted in connection with FIG. 5 above. The PPL as defined in equations 1 and 2 (e.g., for the adaptive process) are similar to those referenced above in connection with the static calibration. For example, $PPL_{TX}$ is similar to PPL ideal (PPL_I) (or the first psychoacoustic perceived loudness) and $PPL_{RX}$ is similar (PPL_M) ((or the second psychoacoustic perceived loudness) (e.g., each of PPL ideal (PPL_I) and (PPL_M) have been noted above). The PPL as referenced in connection with equations 1 and 2 are being redefined for purposes of brevity. ES(s,j) generally corresponds to the critical sub-band in the psychoacoustic frequency range for the loudspeakers and TS(s,j) generally corresponds to the psychoacoustic hearing threshold for each critical sub-band. If ΔS(s,j) is greater than 0, then the audio content in the sub-band j is audible to the listeners. If ΔS(s,j) is less than 0, then the audio content in the sub-band j is not audible to the listeners.

$PPL_{Loss}$ due to room sound artifacts is defined as:

$$PPL_{Loss}=PPL_{TX}-PPL_{RX}=ES(1,j)-EM(1,j) \quad \text{(Eq. 3)}$$

Eq. 3 may be determined or executed by the various comparators 470*a*-470*d* as noted in connection with FIG. 4. $PPL_{Loss}$ is similar to PPL_L as noted above (i.e., the psychoacoustic perceived loudness loss).

$PPL_{Loss}$ is a complex quantity with information on both magnitude and phase as exhibited directly below.

$$Mag(PPL_{Loss})=|ES(1,j)-EM(1,j)| \quad \text{(Eq. 4)}$$

$$\text{Phase}(PPL_{Loss}) = \arctan\left(\frac{\text{Imaginary}(ES(1, j) - EM(1, j))}{\text{Real}(ES(1, j) - EM(1, j))}\right) \quad \text{(Eq. 5)}$$

If $PPL_{Loss}$ at critical sub-band j has positive magnitude, then the dominant room impairments are due to absorption and/or dissipation. On the other hand, if $PPL_{Loss}$ at critical sub-band j has negative magnitude, then the dominant room impairments are due to reflections and reverberation.

For the case when $PPL_{Loss}$ at critical sub-band j is positive in magnitude, then room equalization might involve amplifying the attenuated critical sub-bands. In general, the compensator circuits 452_a_-452_c_ may determine whether the $PPL_{Loss}$ at the critical sub-band j has a positive magnitude which then amplifies the audio input that is transmitted to the loudspeakers 202_a_-202_c_, respectively.

For the case when $PPL_{Loss}$ at critical sub-band j is negative in magnitude, room equalization might involve attenuating the amplified critical sub-bands. In general, the compensator circuits 452_a_-452_c_ may determine whether the $PPL_{Loss}$ at the critical sub-band j has a negative magnitude which then amplifies the audio input that is transmitted to the loudspeakers 202_a_-202_c_, respectively.

For the case when the phase of $PPL_{RX}$ at critical sub-band j is different than the phase of $PPL_{TX}$ at critical sub-band j by over a certain threshold (or predetermined threshold), then phase correction can be applied by rotating the received critical sub-band phases to match their transmitted counterparts. This complex multiplication is performed as noted above. For example, the compensation circuits 454_a_-454_c_ perform the complex multiplication when the phase of $PPL_{RX}$ at critical sub-band j is different than the phase of $PPL_{TX}$ at critical sub-band j by over a certain threshold (or predetermined threshold). If a particular loudspeaker 202 is shared by more than one microphone 204, then a mathematical operation is performed on $PPL_{RX}$ microphone phases, such as maximum, minimum, average, smoothing, etc. An example of this is the first function block 472 as illustrated in FIG. 4 as the loudspeaker 202_b_ is shared by the microphones 204_a_ and 204_b_.

Figure 6:
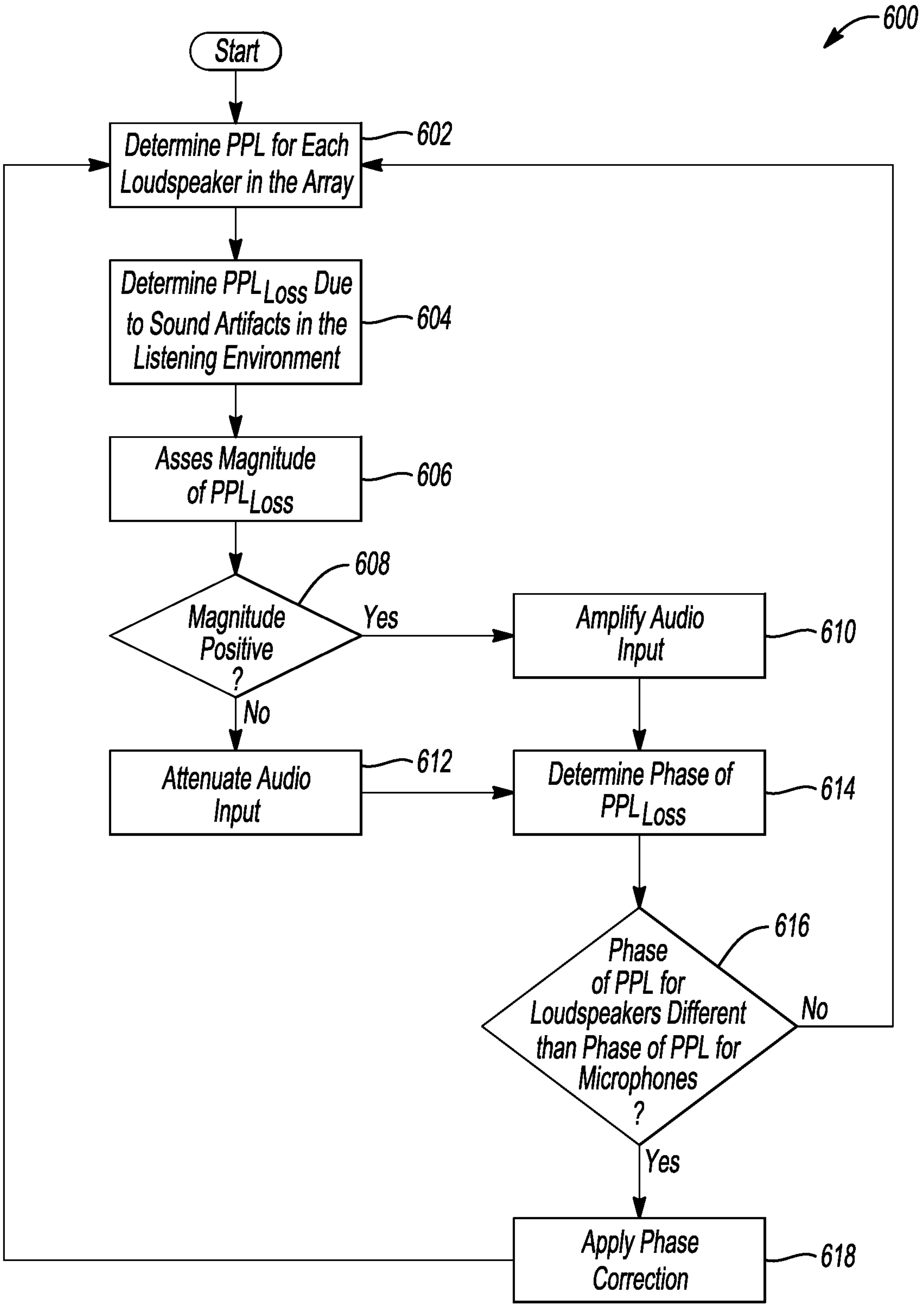
FIG. 6 illustrates a method for performing the adaptive run-time process for the room correction and equalization system of FIG. 5 in accordance to one embodiment.

FIG. 6 illustrates a method 600 for performing the adaptive run-time process for the room correction and equalization system 500 of FIG. 5 in accordance to one embodiment. In operation 602, the audio controller 208 determines the PPL for each loudspeaker 202_a_, 202_b_, 202_c_ in the array. For example, the audio controller 208 determines the PPL for each loudspeaker 202_a_, 202_b_, 202_c_ based on Eq. 1 as noted above. The audio controller 208 also determines the PPL for each microphone 204_a_, 204_b_ in the array based on Eq. 2 as noted above.

In operation 604, the audio controller 208 determines the PPL loss due to sound artifacts that may be present in the listening environment 205. For example, the audio controller 208 determines the PPL loss attributed to sound artifacts based on Eq. 3 as noted above. In operation 606, the audio controller 208 determines whether a magnitude of the PPL loss for the loudspeakers 202_a_-202_c_ and the microphones 204_a_-204_b_ is positive or negative. For example, in operation 606, the audio controller 208 determines the magnitude of the PPL loss based on Eq. 4 and then determines whether such magnitude is positive or negative. If the magnitude is positive, then the method 600 proceeds to operation 610. If the magnitude is negative, then the method 600 proceeds to operation 612.

In operation 610, the audio controller 208 determines that the PPL loss at the critical sub-band j has a positive magnitude and that dominant listening room impairments are due to absorption and/or dissipation that is present in the listening environment 205. In this case, the audio controller 208 amplifies the audio input provided to the loudspeakers 202_a_-202_c_ in the listening environment 205.

In operation 612, the audio controller 208 determines that the PPL loss at the critical sub-band j has a negative magnitude and that the dominant listening room impairments are due to reflections and reverberation in the listening environment 205. In this case, the audio controller 208 attenuates the audio input provided to the loudspeakers 202_a_-202_c_ in the listening environment 205.

In operation 614, the audio controller 208 determines the phase of the PPL loss for the microphones 204_a_-204_b_ and the loudspeakers 202_a_-202_c_ based on eq. 5 as noted above. For example, the audio controller 208 determines whether the phase of the PPL loss for the loudspeakers 202_a_-202_c_ is different than the phase of the PPL loss for the microphones 204_a_-204_b_ by a predetermined threshold. If this condition is true, then the method 600 moves to operation 618. If not, then the method 600 moves to back to operation 602. In operation 618, the audio controller 208 applies a phase correction to either the critical sub-band phases of the loudspeakers 202_a_-202_c_ (e.g., ES(s,j) or the critical sub-band phases of the microphones 204_a_-204_b_ by rotating the received critical sub-band phases (e.g., the critical sub-band phases of the microphones 204_a_-204_b_) to match their transmitted counterparts (e.g., the critical sub-band phases of the loudspeakers 202_a_-202_c_).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. An audio system comprising:

a plurality of loudspeakers configured to transmit an audio signal in a listening environment;

a plurality of microphones, each being positioned at a respective listening location in the listening environment, the plurality of microphones is configured to detect the audio signal in the listening environment:

at least one audio controller being configured to:

determine a first psychoacoustic perceived loudness (PPL) of the audio signal as the audio signal is played back through a first loudspeaker of the plurality of loudspeakers;

determine a second PPL of the audio signal as the audio signal is sensed by a first microphone of the plurality of microphones; and map the first loudspeaker of the plurality of loudspeakers to the first microphone of the plurality of microphones based at least on the first PPL and the second PPL.

2. The audio system of claim 1, wherein the at least one audio controller is further configured to determine a first magnitude of the first PPL and a second magnitude of the second PPL prior to mapping the first loudspeaker to the first microphone.

3. The audio system of claim 2, wherein the at least one audio controller is further configured to obtain a difference between the first magnitude of the first PPL and the second magnitude of the second PPL prior to mapping the first loudspeaker to the first microphone.

4. The audio system of claim 3, wherein the difference between the first magnitude of the first PPL and the second magnitude of the second PPL corresponds to a PPL loss which is indicative of perceived audible deviations at a listening position in the listening environment.

5. The audio system of claim 4, wherein the audio controller is further configured to compare the PPL loss to a programmable threshold to determine whether to map the first loudspeaker to the first microphone.

6. The audio system of claim 5, wherein the audio controller is further configured to map the first loudspeaker to the first microphone in response to the PPL loss being less than the programmable threshold.

7. The audio system of claim 1, wherein the audio controller is further configured to apply an adaptive process to equalize the audio signal in the listening environment based at least one the first PPL and the second PPL.

8. The audio system of claim 7, wherein the audio controller is further configured to determine the first PPL of the audio signal as the audio signal is played back through each loudspeaker of the plurality of loudspeakers and to determine the second PPL for each microphone of the plurality of microphones of the audio signal as the audio signal is sensed by each of the microphones of the plurality of microphones.

9. The audio system of claim 8, wherein the audio controller is further configured to determine a PPL loss for each loudspeaker of the plurality of loudspeakers and for each microphone of the plurality of microphones based on a difference between the first PPL and the second PPL.

10. The system of claim 9, wherein the at least one audio controller is further configured to amplify an audio input signal to the plurality of loudspeakers to account for absorption and/or dissipation that is present in the listening environment in the event a magnitude for the PPL loss for each of the loudspeakers and each of the microphone is positive.

11. The system of claim 9, wherein the at least one audio controller is further configured to attenuate an audio input signal to the plurality of loudspeakers to account for reflections and reverberation in the listening environment in the event a magnitude for the PPL loss for each of the loudspeakers and each of the microphones is negative.

12. The system of claim 9, wherein the at least one audio controller is further configured to determine whether a phase for the PPL loss for each of the loudspeakers is different from the PPL for each of the microphones by a predetermined amount.

13. The system of claim 12, wherein the at least one audio controller is further configured to apply a phase correction to critical sub-band phases of the plurality of loudspeakers or to critical sub-band phases of the plurality of microphones in the event the phase for the PPL loss for each of the loudspeakers is different from the PPL for each of the microphones by the predetermined amount.

* * * * *